(12) United States Patent
van der Schaar

(10) Patent No.: US 7,095,947 B2
(45) Date of Patent: Aug. 22, 2006

(54) SYSTEM FOR SYNCHRONIZING THE PLAYBACK OF TWO OR MORE CONNECTED PLAYBACK DEVICES USING CLOSED CAPTIONING

(75) Inventor: Auke S van der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1178 days.

(21) Appl. No.: 10/014,201

(22) Filed: Nov. 13, 2001

(65) Prior Publication Data
US 2003/0091322 A1 May 15, 2003

(51) Int. Cl.
*H04N 5/91* (2006.01)
(52) U.S. Cl. .................. 386/66; 386/95; 386/83; 386/46; 386/123; 386/124; 386/92
(58) Field of Classification Search .................. 386/66, 386/95, 83, 46, 123–124, 92
See application file for complete search history.

(56) References Cited

U.S. PATENT DOCUMENTS

| | | | | |
|---|---|---|---|---|
| 4,009,331 A | * | 2/1977 | Goldmark et al. | 386/38 |
| 4,538,188 A | * | 8/1985 | Barker et al. | 386/54 |
| 5,448,287 A | * | 9/1995 | Hull | 348/39 |
| 6,118,923 A | * | 9/2000 | Rodriguez | 386/69 |

* cited by examiner

*Primary Examiner*—Thai Tran
*Assistant Examiner*—Helen Shibru

(57) ABSTRACT

The present invention is directed to a method and system for synchronizing the replay of a pre-recorded program between a plurality of playback devices utilizing closed-caption data. The internal block of the playback devices are synchronized. Upon receiving program content signals including a series of frames and a string of closed-caption (CC) characters, the string of CC characters is sampled at a predetermined sampling interval, and the sequence of sampled CC characters and the corresponding frame are stored according to a predetermined format in a memory. Thereafter, in response to a user's request, the desired program content signals responsive to the user's request are retrieved from the respective memory of playback devices and displayed for viewing.

21 Claims, 4 Drawing Sheets

INDEX FILE FOR "THE NEWSCHANNEL10700pm0730pm"

| CLOSED CAPTION(CC) | PICTURE NR (OR POSITION) |
|---|---|
| .. | .. |
| Th | 1005 |
| e_ | 1006 |
| we | 1007 |
| at | 1008 |
| th | 1009 |
| er | 1010 |
| _f | 1011 |
| or | 1012 |
| _t | 1013 |
| od | 1014 |
| ay | 1015 |
| ... | ... |

PVR₂

RECORDED THE NEWS
CHANNEL FROM ~ 7:05-
7:30 OR AT AN
ANOTHER TIME
ON HARDDISK.

| Pic nr | ... | 904 | 905 | 906 | ... |
|---|---|---|---|---|---|
| | | 70F | 70F | 70F | |
| CC | | Th | e_ | we | at |

INDEX FILE FOR "THE NEWSCHANNEL10705pm0730pm"

| CLOSED CAPTION(CC) | PICTURE NR (OR POSITION) |
|---|---|
| .. | .. |
| Th | 904 |
| e_ | 905 |
| we | 906 |
| at | 907 |
| th | 908 |
| er | 909 |
| _f | 910 |
| or | 911 |
| _t | 912 |
| od | 913 |
| ay | 914 |
| ... | ... | und
SYSTEM FOR SYNCHRONIZING THE PLAYBACK OF TWO OR MORE CONNECTED PLAYBACK DEVICES USING CLOSED CAPTIONING

BACKGROUND OF THE INVENTION

1. Field of the Invention

The present invention relates generally to an information system, and more particularly to a system and method for synchronizing the replay of a pre-recorded program between a plurality of playback devices utilizing closed-caption data.

2. Description of the Related Art

Both ReplayTV (trademark of REPLAY NETWORKS, INC., of Palo Alto, Calif.) and TiVo (trademark of TIVO, Inc., of Sunnyvale, Calif.) are the first wave of a new type of "VCR" that gives the viewer new abilities to capture and manipulate the stream of television shows, which flow from their cable and satellite systems. These personal interactive devices act as a personal assistant by recording programs that interest viewers and assisting the viewers to watch the recorded programs when they wish. Both devices have the ability to pause/rewind programs as they are broadcast, to watch a recorded program while recording another, to record for both short and long-term archival, and other related features including an electronic program guide (EPG), time-shifted viewing, and unattended recording of programs.

Currently, many efforts are made to develop integrated information systems that combine the above-described personal interactive devices and the Internet technologies to give new abilities to interact between users. For example, in a web-browsing environment, end user systems are linked together via the Internet with enhanced information delivery and interactive features, such as teleconferencing, video conferencing, etc. Some features allow two different end users to interact with the on-screen content by jumping to a specific section of information. To this end, one end user typically must transmit the concerned information to the other end user. However, such transmission requires a large bandwidth. In addition, it is not possible to search and jump to the related information between users as they interact together. Accordingly, the present invention proposes a mechanism for synchronizing the content being displayed on two or more playback systems, such that the replay of a particular portion of the program can be performed simultaneously.

SUMMARY OF THE INVENTIONS

The present invention relates to a system and method for synchronizing the replay of a pre-recorded program between a plurality of playback devices utilizing closed-caption data.

According to an aspect of the present invention, a method for synchronizing the playback of a pre-recorded program stored in a plurality of playback devices includes the steps of: receiving incoming program content signals comprised of a series of frames and a string of closed-caption (CC) characters, wherein the incoming program content signals are from one of an antenna, a cable, a direct satellite, the Internet, a fiber optical cable, a telephone line, and an external storage device; sampling the string of said CC characters at a predetermined sampling interval, wherein the sampling interval represents at least one CC character for each frame; storing a sequence of sampled CC characters and the corresponding frame according to a predetermined format in a memory; and, simultaneously displaying a desired segment of the program content signals between the plurality of playback devices in response to a user's request. The method further includes the steps of: inputting the user's request identifying the location of desired program content signals to the plurality of playback devices; retrieving the desired program content signals responsive to the user's request from the respective memory of playback devices; and, displaying the desired program content signals for viewing by the plurality of playback devices.

According to another aspect of the present invention, a method of synchronizing the playback of a program between a plurality of playback devices includes the steps of: analyzing incoming program content signals including a series of frames and closed-caption (CC) signals; retrieving the CC signals from the program content signals; formatting the retrieved CC signals and the corresponding segment of program content signals according to predetermined criteria into a storage device; transmitting a request, by a first playback device to a second playback device, to retrieve a desired segment of the program content signals stored in the respective storage device for viewing; and, synchronously displaying the desired segment of program content signals by the first playback device and the second playback device. The retrieved CC signals are formatted by sampling the CC signals and the corresponding segment of said program content signals at a predetermined sampling frequency to generate a sequence of sampled CC data elements, and the sequence of sampled CC data elements is stored in a memory.

Another aspect of the present invention provides a system capable of synchronizing the playback of a program between a plurality of playback devices. The system includes a signal receiving unit for receiving program content signals, the program content signals including a series of frames and closed-caption (CC) signals; an analyzing unit for analyzing the program content signals to identify the CC data; a data sorting unit for extracting and separating the CC signals from the program content signals and for sampling the CC signals and the corresponding program content signals at a predetermined sampling interval; a clock generator for generating the predetermined sampling interval; a memory for storing a sequence of the extracted CC signals and the corresponding program content signals for a subsequent retrieval; a playback unit, coupled to the memory means, for selectively controlling the display of the program content signals based on a user's request; and, a user control unit for inputting the user's request to jump to a desired segment of the program content signals.

The foregoing and other features, and advantages of the invention will be apparent from the following, more detailed description of preferred embodiments as illustrated in the accompanying drawings in which reference characters refer to the same parts throughout the various views. The drawings are not necessarily to scale, the emphasis instead is placed upon illustrating the principles of the invention.

BRIEF DESCRIPTION OF THE DRAWINGS

A more complete understanding of the method and apparatus of the present invention is available by reference to the following detailed description when taken in conjunction with the accompanying drawings wherein:

FIG. 3 is a simplified block diagram illustrating the components of the personal video recorder according to an embodiment of the present invention;

Figure 4:
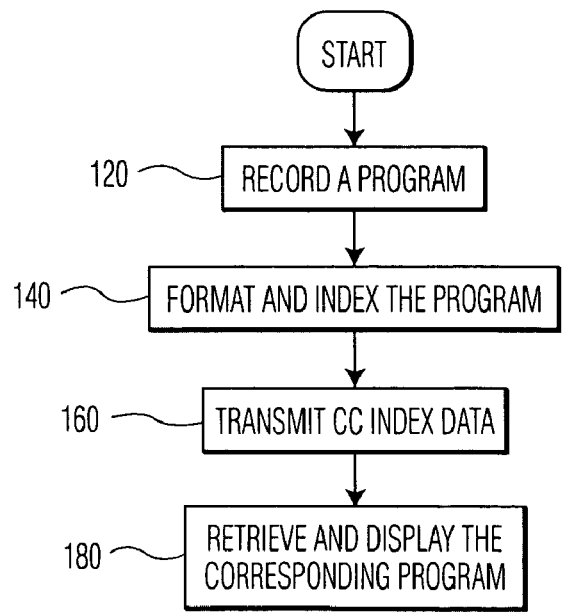
Figure 5A:
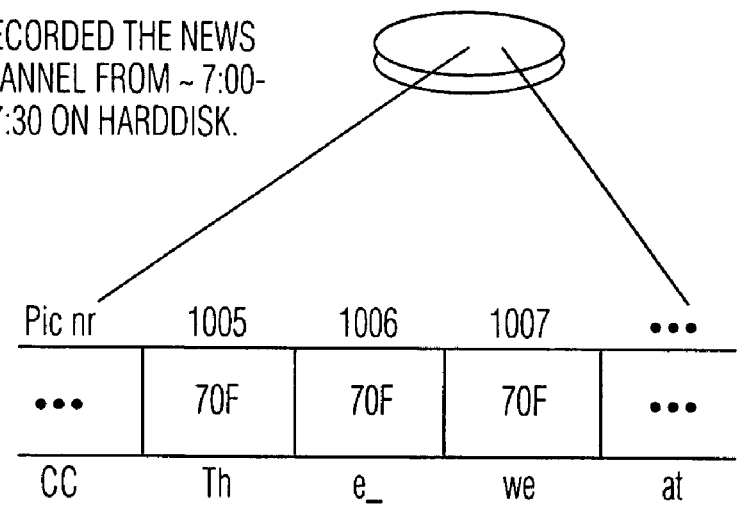
Figure 5B:
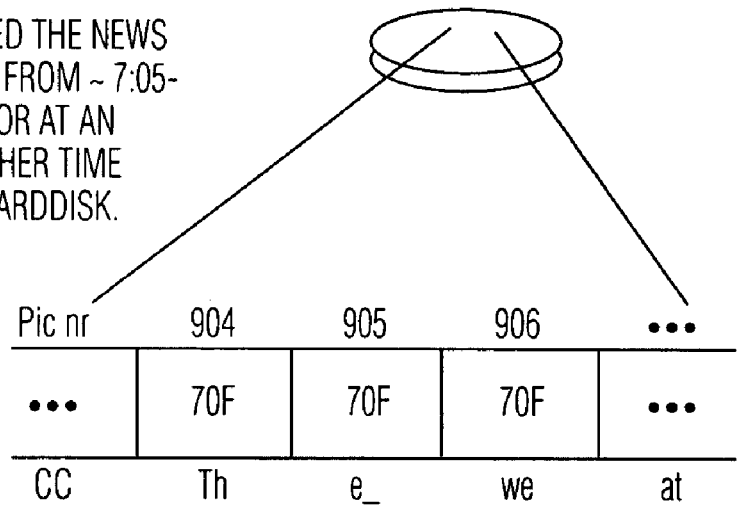

FIG. 4 is a flow chart illustrating the playback process consistent with the present invention; and, FIG. 5 is a diagram illustrating closed-caption (CC) detection and indexing table according to an embodiment of the present invention.

DETAILED DESCRIPTION OF THE EMBODIMENTS

In the following description, for purposes of explanation rather than limitation, specific details are set forth such as the particular architecture, interfaces, techniques, etc., in order to provide a thorough understanding of the present invention. For purposes of simplicity and clarity, detailed descriptions of well-known devices, circuits, and methods are omitted so as not to obscure the description of the present invention with unnecessary detail.

Figure 1:
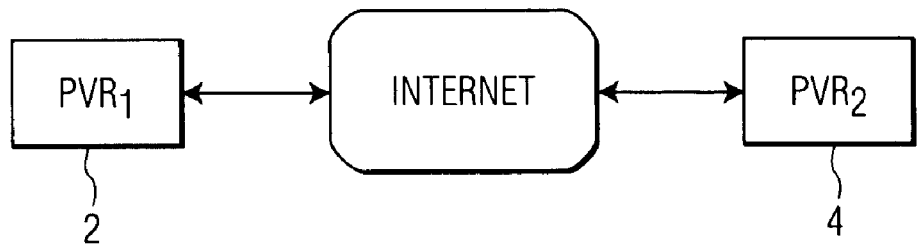
FIG. 1 is a simplified block diagram illustrating the architecture of a communication system whereto the embodiment of the present invention is to be applied.

FIG. 1 illustrates a network to which the embodiment of the present application is applied. The network includes a first personal video recorder (PVR$_1$) 2 exchanging data with a second personal video recorder (PVR$_2$) 4 via the Internet network. The Internet connection can be via a high-speed line, RF, conventional modem, or by way of a two-way cable carrying the audio/video programming. It should be noted that the data and audio/video programming can be delivered via other transmission means, including satellite, cable, wire, or other possible networks, such as a direct private network and a wireless network. In addition, although a limited number of PVRs is shown in FIG. 1 for illustrative purposes, it is to be understood that the present invention can support concurrent communications between a much larger number of PVRs. Thus, the number of PVRs in the drawing should not impose limitations on the scope of the invention.

Figure 2:
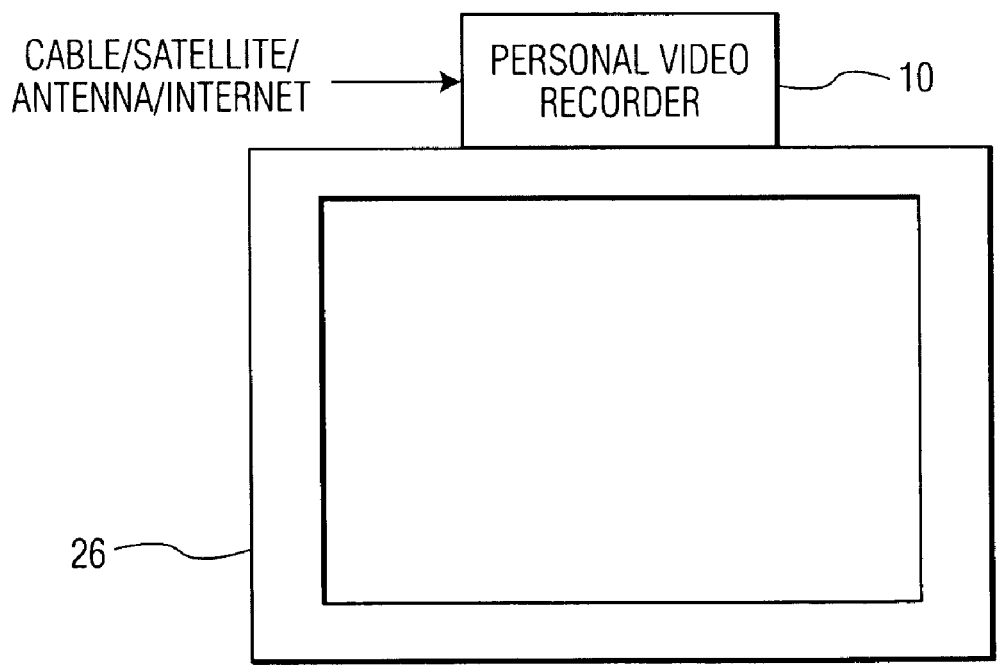
FIG. 2 is a block diagram of the personal video recorder according to an embodiment of the present invention.

In operation, the PVR interacts with other PVRs through the on-screen content by selectively jumping to a specific segment of the program, such that the playback devices in communication with each other are playing the same segment simultaneously, thus allowing the users to interact in a synchronized manner. To achieve this, as shown in FIG. 2, the PVR 10 receives audio/video programming containing closed-caption (CC) signals from the conventional television (TV) broadcast, cable transmission, optical fiber transmission and other content sources, i.e., the Internet. The incoming program content signals are then analyzed to identify the closed-caption (CC) data. The CC text-strings are well-known to those of ordinary skill in the field of broadcasting and included for the hearing impaired in each video frame where the CC is needed. As the incoming program content signals are being recorded, the CC signals are extracted and saved in a storage medium for a subsequent retrieval. During the extraction process, the CC text-strings are sampled at a predetermined sampling frequency, then a sequence of sampled CC text characters and the matching video frame are stored in a table format.

Thereafter, during a replay mode, one end of a PVR user sends a signal to other PVRs requesting the replay of a particular portion of the pre-recorded program stored in the respective storage medium at a specified time. Upon receiving such a request, each PVR determines the location of the sampled CC character(s) responsive to the request signal, then retrieves the corresponding video frame to be displayed at the specified time.

Figure 3:
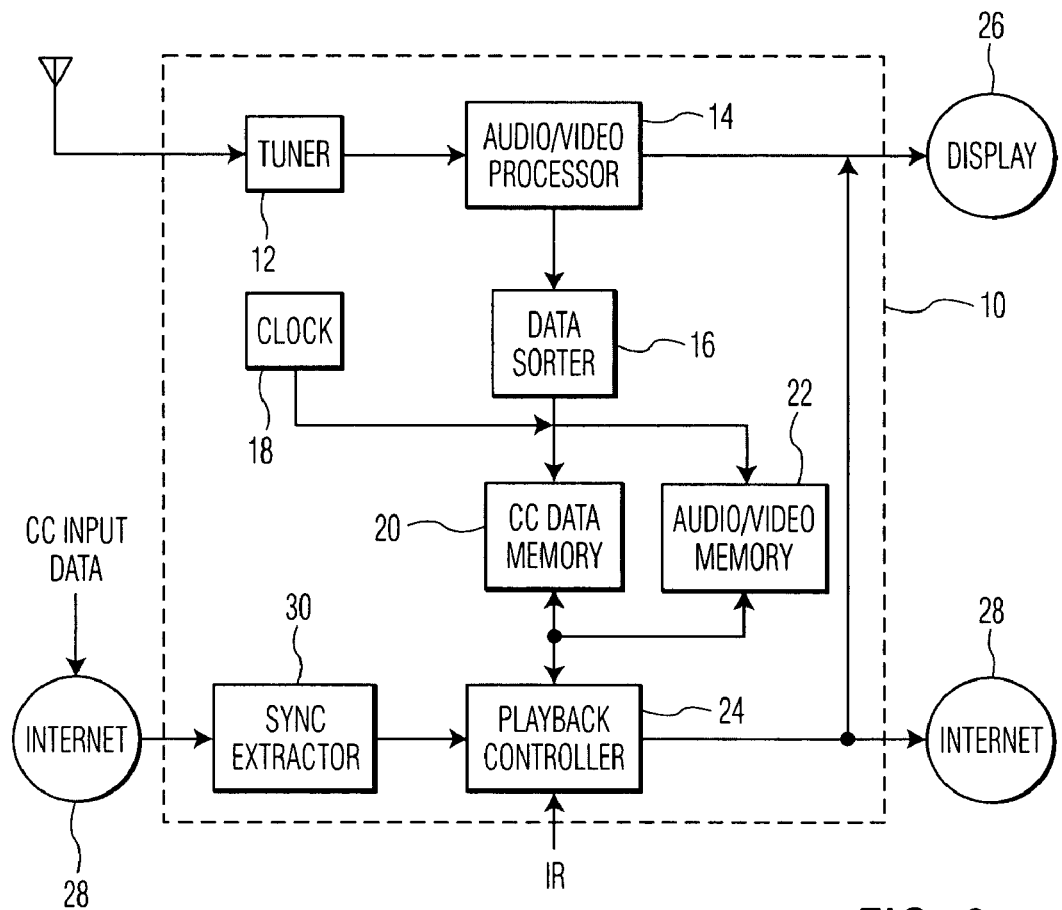

FIG. 3 illustrates a simplified block diagram of a PVR system 10 according to an exemplary embodiment of the present invention. The PVR system 10 includes a tuner 12; an audio/video processor 14; a data sorter 16; a clock 18; a CC data memory 20; an audio/video memory 22; a playback controller 24; a display 26; an Internet interface 28; and, a sync extractor 30. The PVR system 10 can be part of a computer or television receiver. As shown in FIG. 3, the tuner 12 receives RF transmission from an antenna or any other suitable devices that transmit program signals, such as cable, telephone line, or a direct broadcast satellite. The tuner 12 is coupled to the audio/video processor 14, which outputs the respective audio and video signals to the display 26 for viewing. The audio/video processor 14 is coupled to the data sorter 16, which extracts the CC data and the related audio/video signals associated with the program received by the tuner 12. The extracted CC data is stored in the CC data memory 20, while the audio/video memory 22 is stored in the audio/video memory 22. Alternatively, both the CC data memory 20 and the audio/video memory 22 can be integrated as a single memory medium.

The clock provides a sampling interval, which represents the number of CC samples taken from the output signals of the audio/video processor 14 and may be used for synchronizing the interconnected PVRs. Two CC characters are typically included in a single picture frame, thus the sample interval would be the duration of a single frame. However, this number of characters inserted in a single frame may change according to the content provider program, thus the sampling frequency or interval can be adjusted as occasion demands. The playback controller 24, coupled to the CC data memory 20 and the audio/video memory 22, retrieves the program content requested by the user and forwards the retrieved content signals to the display 26.

A user may activate and control the PVR 10 using a user control unit, such as an infrared remote control, or a data entry device, such as a keyboard, or any suitable information input mechanism. Using the user control unit, the user of PVR 10 transmits a signal including the reference CC index information to other PVRs via the Internet connection 28, or other suitable communication means, to jump to a particular segment of the pre-recorded program. Upon receiving such a request, the sync extractor 30 extracts the audio/video data matching the CC index input from the respective memory mediums for displaying the related content to the display 26.

Now, a description will be made in detail relating to the operation steps of synchronizing the playback of a pre-recorded program content between two or more connected PVRs.

Referring to FIG. 4, the PVR 10 as depicted in FIG. 3 can be implemented as follows. First, in step 120, the respective PVR system records a particular program received thereon in the memory medium. For example, as shown in FIG. 5, the PVR$_1$ records a news program from 7:00 p.m. to 7:30 p.m., while the PVR$_2$ records the same news program from 7:05 p.m. to 7:30 p.m. or at another time. During the recording mode, in step 140, the CC texts are sampled at two characters per picture, while the audio/video signals corresponding to the picture frames are indexed, as shown in FIG. 5. That is, both PVR systems record and index the sampled CC texts in the same format for a subsequent retrieval. Thereafter, in step 160, if the PVR$_1$ sends a message signal to the PVR$_2$ at 8:00 p.m. to play a particular segment of the program referred to by "th" or the 5$^{th}$ picture in the CC string-texts stored as "The weather for today Is" the PVR$_2$ system retrieves the audio/picture signals matching the "th" or the 5$^{th}$ picture for viewing in step 180.

Alternatively, to select a desired portion among various programs stored in the respective storage medium, a well-known electronic program guide (EPG) protocol may be utilized. An EPG is a standard application designed to aid the viewer in the navigation of and selection from broadcast material available in a digital TV environment. Basically, an EPG is an interactive, on-screen display feature that displays information analogous to television listings found in local newspapers or TV guides or EPG services like the tribune. The EPG provides information about each program and includes programming characteristics, such as the channel number, program title, start time, end time, elapsed time, time remaining, rating (if available), topic, theme, and a brief description of the program's content. Using the EPG features, viewers can select any channel to be synchronized among the PVR systems. By utilizing the EPG information indexed in a similar format as FIG. 5, the users can specify the beginning and the type of program they desire to synchronize together during a play mode.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

The invention claimed is:

1. A method for synchronizing the playback of pre-recorded program stored in a plurality of playback devices, the method comprising the steps of:
   receiving incoming program content signals comprised of series of frames, said program content signals including a string of closed-caption (CC) characters;
   sampling the string of said CC characters at a predetermined sampling interval, wherein said sampling interval represents at least one CC character each frame;
   storing a sequence of sampled CC characters and the corresponding frame according to a predetermined format in a memory; and,
   simultaneously displaying a desired segment said program content signals between plurality of said playback devices in response to a user's request, wherein the user request is selected from the stored sample characters.

2. The method of claim 1, wherein the step of simultaneously displaying said desired segment includes the steps of:
   inputting said user's request identifying the location of said desired program content signals to the plurality of said playback devices;
   retrieving said desired program content signals responsive to said user's request from the respective memory of said playback devices; and,
   displaying said desired program content signals for viewing by the plurality of said playback devices.

3. The method of claim 1, wherein said incoming program content signals are from one of an antenna, a cable, a direct satellite, the Internet, a fiber optical cable, a telephone line, and an external storage device.

4. The method of claim 1, wherein the plurality of said playback devices is communicating together so that the display of said desired program segment is selectively synchronized.

5. The method of claim 1, wherein said sampling interval corresponds to the duration of a single frame.

6. A method for synchronizing the playback of program between a plurality of playback devices, the method comprising the steps of:
   analyzing incoming program content signals including series of frames and closed-caption signals;
   retrieving said CC signals from said program content signals;
   formatting said retrieved CC signals and the corresponding segment of said program content signals according to predetermined criteria into a storage device;
   transmitting a user request, by a first playback device to a second playback device based on the CC signals, to retrieve a desired segment of program content signals stored in the respective storage device for viewing; and,
   synchronously displaying said desired segment of said program content signal contents by said first playback device and said second playback device.

7. The method of claim 6, wherein the step of transmitting said request includes the steps of:
   entering program parameters in said first playback device identifying the location of said desired program content signals in the storage device of said second playback device using a user control; and,
   retrieving said desired program content signals from the storage device from said second playback device.

8. The method of claim 6, wherein said step of formatting said stored CC signals is performed according to predetermined criteria.

9. The method of claim 6, wherein the step of retrieving said CC signals from said program content signals further includes the steps of:
   sampling said CC signals and the corresponding segment of said program content signals at a predetermined sampling frequency to generate a sequence of sampled CC data elements; and,
   storing said sequence of sampled CC data elements in said storage device.

10. The method of claim 6, wherein said incoming program content signals are from one of an antenna, a cable, a direct satellite, the Internet, a fiber optical cable, a telephone line, and an external storage device.

11. The method of claim 6, wherein the plurality of said playback devices is communicating together so that the display of said desired program segment is selectively synchronized.

12. The method of claim 6, wherein said sampling interval corresponds to the duration of a single frame.

13. A system for synchronizing the playback of a program between a plurality of playback devices, comprising:
   a signal receiving unit for receiving program content signals, the program content signals including series of frames and closed-caption signals;
   an analyzing unit for analyzing the program content signals to identify said CC data;
   a data sorting unit for extracting and separating said CC signals from the program content signals and for sampling said CC signals and the corresponding program content signals at a predetermined sampling interval;
   a clock generator for generating said predetermined sampling interval;
   a memory for storing sequence of said extracted CC signals and the corresponding program content signals for a subsequent retrieval; and,
   a playback unit, coupled to said memory means, for selectively controlling display of the program content signals based on a user's request; wherein the user request is selected from the stored sample characters.

14. The system of claim 13, further comprising a user control unit for inputting said user's request to jump to a desired segment of the program content signals.

15. The system of claim 14, wherein said user control comprises one of an infrared remote control and a keyboard.

16. The system of claim 13, wherein the system is external to one of a television receiver and a computer monitor.

17. The system of claim 13, wherein the incoming program content signals are from one of an antenna, a cable, a direct satellite, the Internet, a fiber optical cable, a telephone line, and an external storage device.

18. The system of claim 13, wherein the plurality of said playback devices is communicating together so that the display of said desired program segment is selectively synchronized.

19. The system of claim 13, wherein said clock generator synchronizes the internal clock of the plurality of said playback devices.

20. The system of claim 13, further comprising an extractor for retrieving the desired program content signals from said memory.

21. The system of claim 13, wherein said predetermined sampling interval corresponds to the duration of a single frame.

* * * * *